United States Patent [19]

Keller et al.

[11] Patent Number: 5,351,776
[45] Date of Patent: Oct. 4, 1994

[54] ELECTRONIC SYSTEM FOR A MOTOR VEHICLE

[75] Inventors: Frieder Keller, Bretten; Martin Streib, Vaihingen/Enz; Otto Holzinger, Eschenbach; Rolf Leonhard; Thomas Gölzer, both of Schwieberdingen, all of Fed. Rep. of Germany

[73] Assignee: Robert Bosch GmbH, Stuttgart, Fed. Rep. of Germany

[21] Appl. No.: 863,006

[22] Filed: Apr. 6, 1992

[30] Foreign Application Priority Data

Apr. 5, 1991 [DE] Fed. Rep. of Germany ....... 4111023

[51] Int. Cl.$^5$ ..................... B60K 31/04; B60T 8/00; B60T 17/22
[52] U.S. Cl. .................. 180/79.1; 180/197; 303/93; 303/97; 303/100; 303/109; 303/DIG. 4; 364/424.1; 364/426.04; 364/431.04; 364/431.05; 364/431.07; 364/431.08; 477/73; 477/75; 477/94
[58] Field of Search ................ 364/424.1, 426.02, 431, 364/426.04, 431.04, 431.05, 431.07, 431.08; 74/866; 180/197; 303/93, 97, 100, 109, DIG. 4

[56] References Cited

U.S. PATENT DOCUMENTS

| | | | |
|---|---|---|---|
| 4,606,586 | 8/1986 | Eckert et al. ......................... | 303/93 |
| 4,941,097 | 7/1990 | Karnopp et al. ................ | 364/424.05 |
| 5,099,429 | 3/1992 | Onari et al. ..................... | 364/431.05 |
| 5,113,721 | 5/1992 | Polly ............................... | 364/424.1 |
| 5,161,432 | 11/1992 | Matsumoto et al. ............. | 364/424.1 |

FOREIGN PATENT DOCUMENTS 2554775 6/1977 Fed. Rep. of Germany.

Primary Examiner—Mitchell J. Hill
Attorney, Agent, or Firm—Walter Ottesen

[57] ABSTRACT

The invention is directed to an control system for a motor vehicle and includes: a plurality of control elements coacting for carrying out control tasks with reference to engine power, drive power and braking operation, respectively, and a plurality of coordinating elements for coordinating the coaction of the first elements to effect a control of operating performance of the motor vehicle in correspondence to a request of the driver. The elements are arranged in the form of a plurality of hierarchial levels. At least one of the coordinating elements of one of the hierarchial levels is adapted for acting on the elements of an adjacent hierarchial level when translating the request of the driver into a corresponding operating performance of the motor vehicle thereby acting on a pregiven subordinate system of the driver-vehicle system while providing the performance required from the higher hierarchial level for this subordinate system.

11 Claims, 4 Drawing Sheets

ELECTRONIC SYSTEM FOR A MOTOR VEHICLE

BACKGROUND OF THE INVENTION

Todays motor vehicles have a plurality of electronic systems such as electronic injection and ignition controls and/or ABS-systems. The introduction of further electronic systems has accelerated in order to fulfill even higher future requirements with respect to the environment, use, safety and comfort of motor vehicles. In this context, especially electronic power controls (E-gas), driving-speed control, ASR-systems and/or electronic transmission control systems but also chassis control systems, steering systems including electronic rear-wheel steering, spacing control systems, navigation systems and/or traffic guidance systems have to be mentioned.

In view of the above, the complexity and number of the electronic systems in motor vehicles will increase further. However, in order to provide a satisfactory control of the motor vehicle, an optimal coaction of the individual electronic systems is necessary. This requirement already leads to problems which however will increase in the future. The greatly increasing number of logic connections between the individual systems Causes the complexity of the wiring harness to increase and additional problems occur with respect to the electromagnetic compatibility and the temperature. In addition, space problems become increasingly important with respect to accomodating the individual control devices in the motor vehicles which are designed according to aerodynamic considerations. The developments carried out independently of one another of the individual electronic systems and their necessary logic connection lead to increasing complexity of the development tasks which, in turn, lead to longer development times for the motor vehicle. In addition, disadvantageous effects with respect to reliability, safety and availability of the motor vehicle occur under certain circumstances because of couplings between the individual systems which were not recognized.

The foregoing is opposed by requirements for shorter development time, higher reliability and the requirement that the motor vehicles be easy to maintain. An optimization of the totality of the electronic controls is also required, that is, an optimization of the overall driver-vehicle system with respect to energy consumption, environmental compatibility, power output and comfort, that is an optimization of the operating performance of the motor vehicle for various vehicle models and types.

The procedure to date was on the basis of individual systems logically connected many times with each other and independent of each other. This procedure has reached its limits because of the conflict between the problems described above and the requirements of future control systems. This is especially the case with respect to controlling the overall system. With the structure of the electronic control in a motor vehicle as it has been known to date, the problems described above are neither solved nor are the future requirements satisfied.

For this reason, solutions for electronic overall systems in motor vehicles must be found which fulfill the requirements for shorter development time, higher reliability, availability and reduced service of the motor vehicle while at the same time greatly increasing the use of electronic systems while optimizing the operating performance of the motor vehicle influenced by the totality of the electric systems.

For example, the article of N. A. Schilke et al entitled "Integrated Vehicle Control" published in Convergence 88, pages 97 to 106, discloses a control structure for a motor vehicle having three hierarchial levels without more precise reference to data and command flow and interfaces. The lowest hierarchial level is here defined by the actuator devices carrying out the control functions whereas a second hierarchial level represents the individual control elements of the particular subsystem of the motor vehicle such as brakes, steering, drive, chassis, etcetera. The highest hierarchial level is defined by a coordinator which coordinates the coaction of the individual elements in dependence upon the requests of the driver of the vehicle.

A hierarchial control structure for the coaction of the transmission control and throttle flap control is disclosed in the article of M. Ibamoto et al entitled "Advanced Technology of Transmission Control" published in Hitachi Revue, Volume 39, Number 5, October 1990, pages 307 to 312. The driver request is detected via the following parameters: accelerator pedal angle, engine speed and road speed of the vehicle. Proceeding from the driver request, a desired value for the driving force of the motor vehicle is computed. This desired value is then converted into a corresponding control of the throttle flap and into a gear position.

The above approach considers only a single problem so that the problems with respect to the overall vehicles cannot be solved with these measures.

SUMMARY OF THE INVENTION

It is an object of the invention to provide an electronic system for a motor vehicle which makes possible the following: a shortening of the development time, an increase in the reliability and availability of the vehicle as well as making maintenance of the vehicle easier.

This object is achieved in that elements are provided which coordinate the coaction of the control systems in the sense of a control of the operating performance of the vehicle in correspondence to the driver requests and that these elements are arranged in a form of a hierarchy having several hierarchial levels. The command flow between the individual hierarchial levels takes place only in one direction and at least one coordinating element of each hierarchial level intervenes with the conversion of the driver's request into a corresponding performance of the elements on the next hierarchial level and, in this way, on a pregiven subsystem of the driver-vehicle system while making available the performance required by the particular higher hierarchial level for this subsystem.

U.S. Pat. No. 4,941,097 discloses an electronic system for steering control. Here, the extent of steering of the wheels is adjusted in dependence upon the steering angle and a desired value for the yaw velocity of the vehicle.

The article of J. Konishi et al entitled "Development of Electronically Controlled Air Suspension System" published by the Society of Automotive Engineers, Inc. as SAE paper 881770 (1988) discloses an electronic system for chassis control which operates on the spring/shock system of a motor vehicle in dependence upon the vehicle acceleration or deceleration, the steering angle and/or an actuable switch, that is, the wheel load is adjusted in dependence upon these operating conditions.

U.S. Pat. No. 4,606,586 discloses an electronic brake control system having an ABS-function. The braking force on the wheels is adjusted in a controlled manner in dependence upon the position of the accelerator pedal and the desired deceleration of the vehicle derived therefrom.

Electronically controllable transmissions are, for example, disclosed in the text entitled "Kraftfahrtechnisches Taschenbuch" published by Robert Bosch GmbH, 1984, pages 472 and 473. In this reference text, the conversion of the transmission as well as the shift position of a converter clutch are adjusted in dependence upon the set gear, the engine speed and the position of the accelerator pedal, etcetera.

Published German patent application 2,554,775 discloses a bus system for logically connecting several control elements which access a common memory region.

The above-mentioned problems are solved with the approach provided by the applicants' invention.

The hierarchial structure of the total system permits a command path only from above to below. The commands for carrying out the driver's request are transmitted in this direction. In this way, a manageable structure having elements independent of each other is provided. The logical connection of the individual systems is reduced to an acceptable level.

The independence of the individual elements from each other ensures a parallel simultaneous development of these individual elements. Each element can be continuously developed pursuant to a pregiven strategy tailored to that particular element. Only a reduced number of interfaces to a higher hierarchial level are to be considered and only a few interfaces are to be considered to a lower hierarchial level. This makes a total optimization of the driver-vehicle system possible with respect to the requirements as to fuel consumption, environmental adaptability, safety and comfort.

The interfaces between the hierarchial levels are orientated to the physical characteristics of the motor vehicle and permit the integration of further electronic elements or systems into the existing overall system since these additional systems are developed in and of themselves and are integrated into the hierarchial level only while considering the interface. This leads also to a flexible manipulation of changes and adaptations to various motor vehicles or types. The installation of, for example, another transmission leads only to a change in the element controlling the transmission. The other elements of the overall system are not affected by the change. In addition, the suitable selection of the interface simplifies defining the higher level functions.

The interface selection is especially advantageous in accordance with the foregoing when this selection is orientated to subsystems of the driver-vehicle system such as the engine (engine power), output (engine and transmission), wheel drive (drive and brakes), driving dynamics (dynamic of movement and/or steering and/or chassis) or driver request. In this way, hierarchial levels with respect to engine, output, wheel drive, vehicle and/or driver-vehicle system are formed.

These advantages can be further amplified by a suitable circuit realization by means of a master controller. By using a master controller connected to the individual elements via bus systems, the distributed control apparatus can be retained in the manner as was done previously.

In the master controller, system-transcending functions are then programmable, for example, in high-level language with these functions being changeable or developed without intervention into the individual elements. In addition, the master controller can be utilized as a diagnostic interface or as a computer unit for individual elements which are of simple configuration. These individual elements can then be mounted in the field at the unit carrying out the control function which is to be performed. In this way, a manageable construction as well as a capability of testing the individual components is provided. The individual elements can then furthermore be developed in time parallel to each other and independently of each other. The development time is then reduced for an overall system also with respect to adaptation to other motor vehicle types.

A further advantage is defined by the application of a master controller which has a gateway and to which several bus systems having different transmitting speeds can be connected with these transmitting speeds being for the motor vehicle electronics (illumination, seat adjustment, etcetera) or for telecommunications systems.

The procedure defined by the invention shortens the development time of a system and improves reliability, availability, facilitates servicing and applicability of the systems.

BRIEF DESCRIPTION OF THE DRAWINGS

The invention will now be described in reference to the drawings wherein.

DESCRIPTION OF THE PREFERRED EMBODIMENTS OF THE INVENTION

Figure 1:
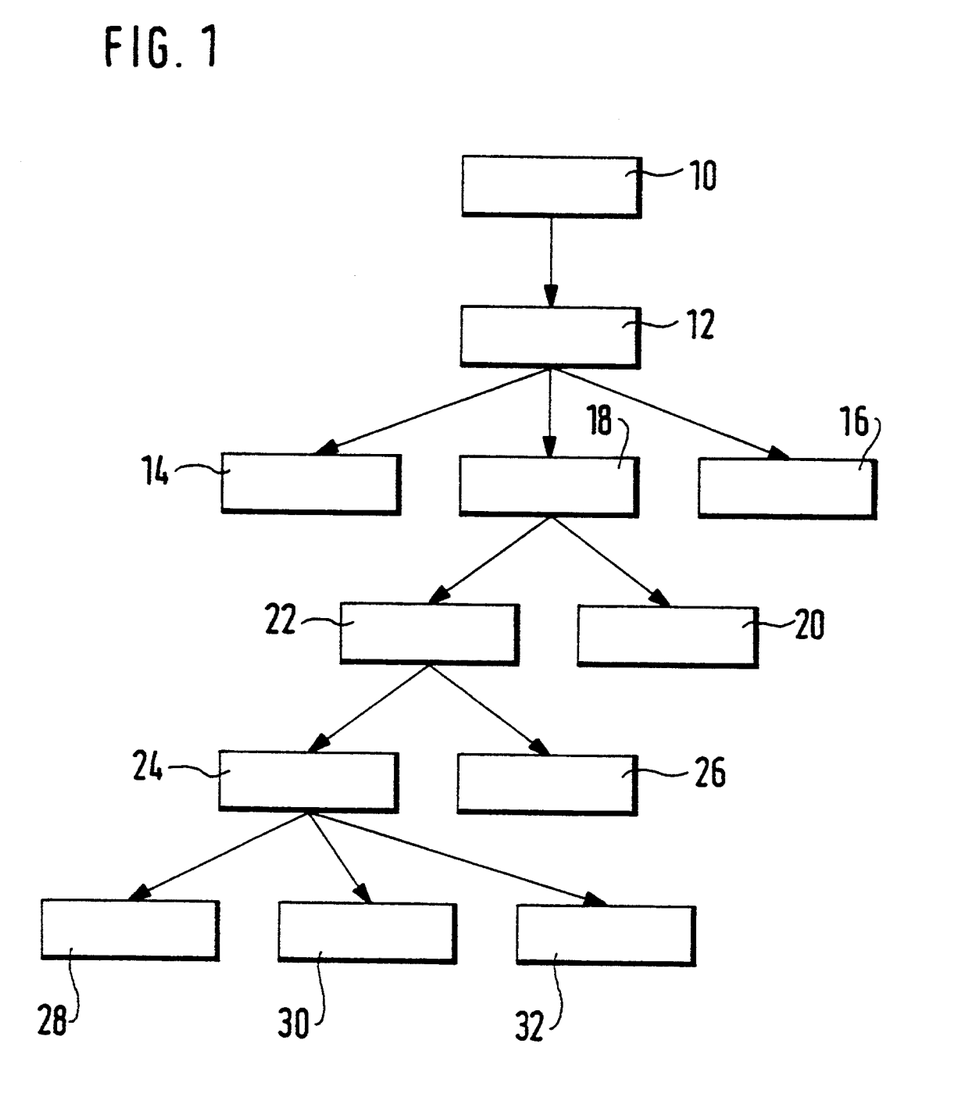
FIG. 1 is a schematic of an electronic system for a motor vehicle which is arranged in different hierarchial levels with the interfaces of the system being orientated to the physical conditions of the driver-vehicle system.

In FIG. 1, reference numeral 10 identifies the driver of a motor vehicle and thereby defines the highest hierarchial level.

The driver request detected via element 10 is supplied to the second hierarchial level, namely, to the element 12. Element 12 converts the driver request into signals for influencing the driving dynamics of the motor vehicle in correspondence to the driver request. In element 12, the driver request is therefore interpreted or evaluated with the view to a desired driving dynamic that is, steering, chassis performance and dynamics of movement (acceleration, deceleration). Element 12 represents therefore the driver-vehicle system.

Element 12 transmits desired values with respect to this subsystem to the third hierarchial level which represents the component or subsystem of the motor vehicle itself. Here, an element 14 is provided which defines the steering interventions and an element 16 which intervenes in the electronic controllable chassis of the motor vehicle as well as an element 18 which acts oh the dynamic of the movement of the vehicle, that is, the wheel drive of the vehicle.

The element 18 gives con, hands to the fourth hierarchial level for influencing the dynamic of the movement of the vehicle and includes element 20 which defines the brake system of the motor vehicle and element 22 which makes available the output power of tile motor vehicle.

The fifth hierarchial level for making available the desired output power is dependent upon element 22 and includes the elements 24 and 26. Element 26 represents the intervention in an electronically controllable transmission of the motor vehicle; whereas, the element 24 takes over the coordination of engine interventions.

The sixth hierarchial level is subordinated to the element 24 and includes the possible engine interventions such as charging (air flow intervention), injection and/or ignition (elements 28, 30, 32).

In a conventional motor vehicle, the driver 10 has the possibility to accelerate the vehicle by displacing the accelerator pedal and to brake the vehicle by actuating the brake pedal and to steer the vehicle by rotating the steering wheel. Possibilities for influencing are provided by actuating keys of the road-speed controller, by adjusting a specific chassis performance or a specific condition of the chassis. In the context of the invention, the driver can however can be seen as a navigation or traffic guidance system which provides the corresponding commands such as braking, accelerating, steering, etcetera.

These commands supplied by the driver are detected by corresponding measuring devices such as via position sensors for the accelerator pedal, brake and/or steering wheel and supplied to the second hierarchial level (to element 12). From the inputted information, element 12 determines a steering angle and, if necessary, a desired yaw speed of the motor vehicle for the steering element 14 which, as mentioned above under the state of the art, controls the steering movements of the wheels. The steering angle is primarily derived from the steering wheel position. In addition, the element 12 transmits the position of the wheel load desired by the driver to the element 16. Element 16 controls the chassis in the manner described above with respect to the present state of the art. The position of the wheel load can be derived from the desired acceleration and/or from a selection switch appropriately actuated by the driver.

From the accelerator pedal actuation or brake pedal actuation, the element 12 determines the acceleration of the motor vehicle (of positive and/or negative nature) desired by the driver and supplies this acceleration to the element 18 (drive chain and brake) influencing the wheel drive of the motor vehicle.

In lieu of the desired acceleration of the motor vehicle, the element 12 can also transmit the wheel torque to the element 18. The wheel torque is transmitted to the individual wheels for carrying out the driver's request.

Information is supplied to element 18 with respect to the driver's request concerning the wheel drive of the motor vehicle. The element 18 determines from this information the deceleration when the brake is actuated or the wheel brake torque to be developed on the individual wheels in the case of a braking operation or in the case of an acceleration or a uniform operation of the vehicle, the output torque to be developed by the transmission chain. The wheel brake torque or the desired deceleration is supplied by element 18 to the element 20 which represents the brake system according to the state of the art mentioned initially in this disclosure. The element 20 performs the braking operation in accordance with its input information.

The detected variables of the desired output torque are supplied by element 18 to the element 22 defining the transmission chain. There, the desired output torque on the one hand is converted into an engine torque and on the other hand, into a transmission ratio. The determined transmission ratio is then supplied to the element 26 representing the transmission control according to the state of the art mentioned in the beginning of this disclosure. On the other hand, the engine torque value is transmitted to the element 24 which defines the engine control.

Taken together, the desired output torque of the fourth hierarchial level is made available by the element 22 as a combination of desired transmission conversion and a desired engine torque. The selection of operation can be undertaken in accordance with a pregiven strategy, for example minimum energy consumption.

The engine torque required by the engine is made available by element 24 to the engine control by an appropriate selection of the engine power parameters: fuel metered to the engine, ignition time point and/or air supply to the engine. Corresponding control values are supplied to element 28 for the air flow, to element 30 for the injection and to element 32 for the ignition which then adjust the desired values supplied thereto for the throttle flap, the injection valves and the ignition setting.

This hierarchial structure of an electronic system for a motor vehicle has the advantages described initially in this disclosure. The individual elements can furthermore be considered independently of each other while considering only few interfaces in accordance with a specific strategy, for example, favorable consumption values and the like. Next higher functions can be developed even independently of the other elements. The adaptation of the overall system to other types of vehicles and/or motor vehicle component types can be realized by changing the appropriate elements without it being necessary to intervene in the affected elements. This supports also the convenient servicing of the motor vehicle since each element has limited tasks to fulfill.

The differences of the electronic system of the invention compared to conventional systems are illustrated in the context of an ASR-function which operates on the power parameter of the engine. This will provide a better understanding of the electronic system of the invention.

In conventional systems and when the ASR Control unit detects too large a wheel slippage, this control unit intervenes directly in the air charge, injection and/or ignition for reducing the drive power. On the one hand, this requires in the ASR-control unit a representation of engine control functions for determining the variable of the parameter to be reduced; while, on the other hand, corresponding interfaces are needed in the engine control system especially to other systems for coordinating the ASR-intervention.

The electronic system according to the invention has an element 18 (drive chain and brake) which computes a drive torque from the acceleration of the vehicle derived from the driver request. This drive torque is supplied to the element "engine and transmission" and it is then up to this element to make available the desired drive torque. In this way, intervention of an ASR function in the engine control itself is avoided. The element 18 (drive chain and brake) contains only a simple model of the engine control.

The above-mentioned ASR-intervention then takes place when the drive wheels slip by means of the command "reduce drive torque" of the element 18 to the element 22. Element 22 then selects a corresponding transmission ratio in correspondence to the required value of the drive torque and a corresponding engine torque which shows an optimal constellation with reference to the consumption of fuel or environmental adaptability. The variables transmitted to the elements 24 and 26 are adjusted at the engine or transmission by these elements 24 and 26 or the elements 28 to 32 from the viewpoint of a rapid reaction, a minimal consumption of fuel etcetera.

The foregoing shows that the selection of the individual elements and hierarchial levels has to correspond to the physical interfaces of the vehicle, that is, the effects of the mechanical component systems. For example, the most important task of the engine is making available an engine torque or a drive torque at the clutch mounted between engine and transmission. The parameter engine torque is therefore a suitable interface description to the higher level element "engine and transmission". Comparable considerations form the basis of the determination of the other above-mentioned interfaces between the individual elements.

Other interface definitions orientated to the effects of other component systems of the motor vehicle can however be realized in other embodiments with the same success.

For carrying out the particular functions by means of the individual elements, operating variables are needed of the following: motor vehicle, engine and/or motor vehicle ambient. These operating variables are supplied to the overall system by corresponding measuring devices and are evaluated by the individual elements.

The elements 14 and 16 are not needed in an advantageous embodiment. In this way, the second and third hierarchial levels melt into each other.

Figure 2:
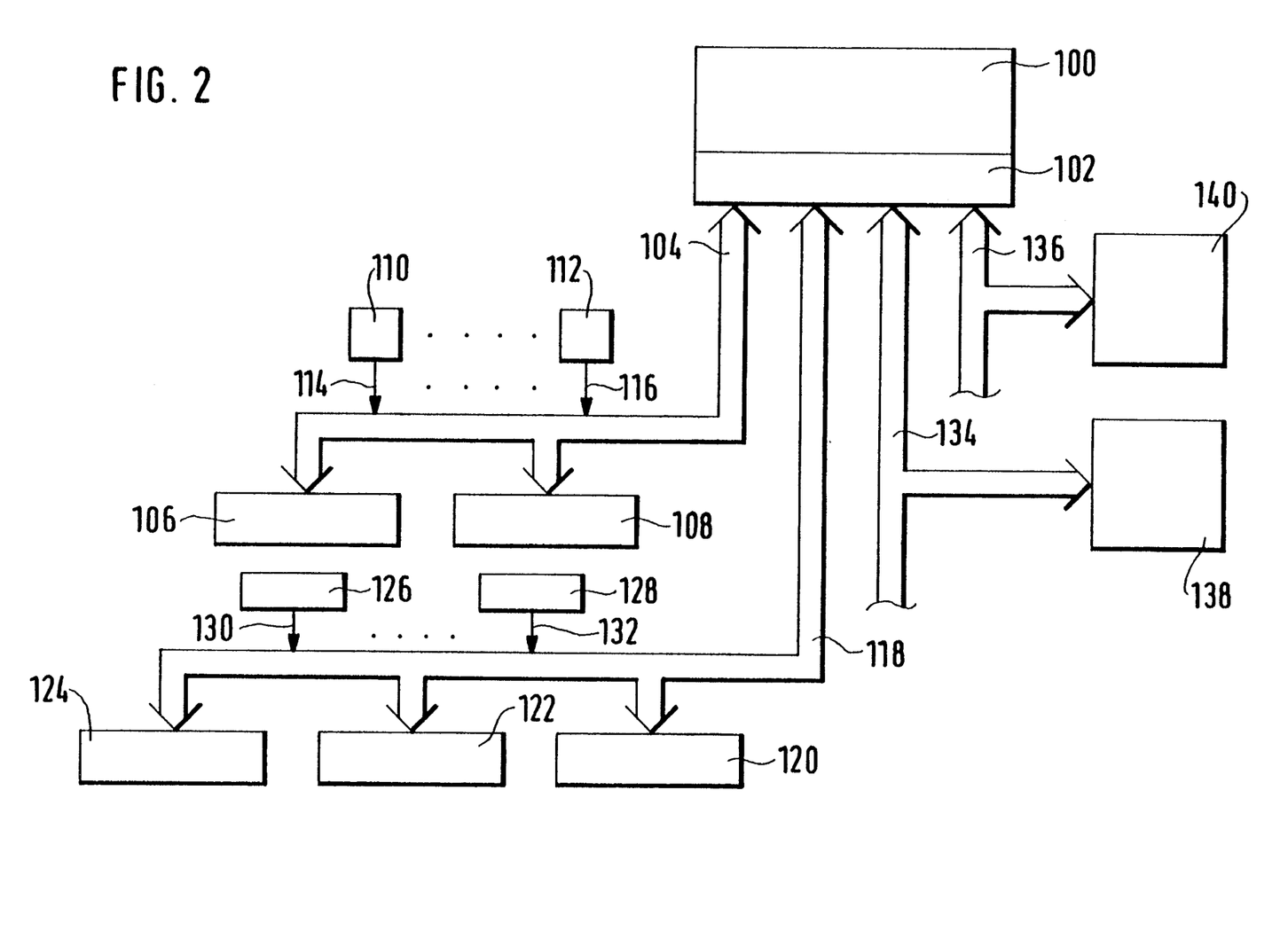
FIG. 2 is a block diagram of an embodiment for realizing this electronic system; and, FIGS. 3 and 4 show a block diagram of an electronic system according to advantageous embodiments of the invention.

FIG. 2 shows a hardware block diagram wherein the above-described electronic system can be realized in an advantageous manner.

Based on the system shown in FIG. 1, reference numeral 100 identifies a master controller which includes an interface 102 (gateway) to which various bus systems are connected. The distribution of these bus systems is exemplary. The first bus system 104 defines the communication between the master controller 100 and the elements controlling the output torque. The bus 104 connects the master controller 100 to a control unit 106 for controlling the engine and a control unit 108 for controlling the transmission. On the other hand, the bus 104 is connected via corresponding lines 114 to 116 to measuring units 110 to 112, respectively. These measuring units 110 to 112 detect the operating variables of the engine and/or of the motor vehicle which are to be evaluated for controlling the drive torque. The operating variables include for example the road speed, engine speed, supplied air quantity or air mass, load, exhaust gas composition, engine temperature, transmission ratio, shift position of the converter clutch, tendency toward knocking, etcetera.

A second bus 118 connects the master controller 100 or its interface 102 to elements for brake control 120, steering 122 and/or for controlling the chassis 124. Analog to the foregoing, operating variables of the engine and/or of the vehicle are supplied to the bus 118 from the measuring units 126 to 128 via corresponding connecting lines 130 to 132, respectively. These operating variables of the engine and/or motor vehicle include wheel rotational speed, spring/shock absorber displacement, braking force, etcetera.

In addition, further bus systems 134 and 136 can be provided which operate with another transmitting rate than the systems 104 and 118. These bus systems can logically connect the master controller 100 to apparatus 138 of the vehicle electric system (light, seat adjustment, etcetera) on bus 136 at a lower transmission rate and to apparatus 140 for telecommunications on bus 136 at a higher transmission rate.

In this embodiment, the individual elements 14, 16, 20, 26 and 28 to 32 of FIG. 1 correspond to control units 106, 108, 120, 122 and 124 connected to the busses. These can be mounted directly on the mechanical actuators in a simple form. The control function, especially the control function of coordinating elements 12, 18 and 24, are then realized as program structures in the master controller 100. The master controller 100 can also operate as an external computing area of elements 106, 108, etcetera (CPU-server). What is important here is that the master controller 100 itself has no sensor and actuator connections. As a central computer of the electronic system, the master controller 100 operates in an advantageous embodiment as a diagnostic memory and diagnostic interface of the motor vehicle.

These measures afford advantageous effects with respect to convenient maintenance, reduced space requirements, testing, etcetera.

Figure 3:
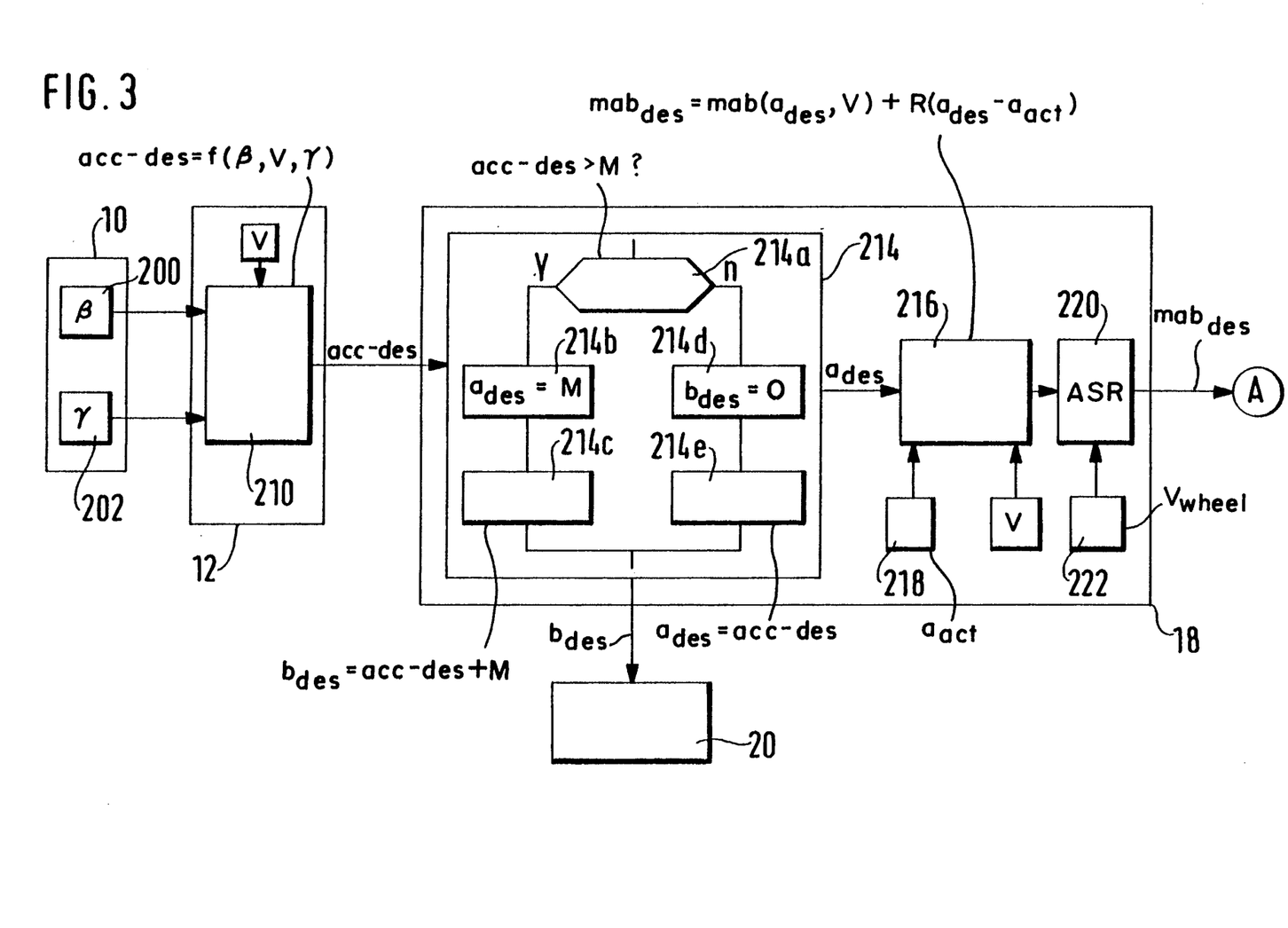
Figure 4:
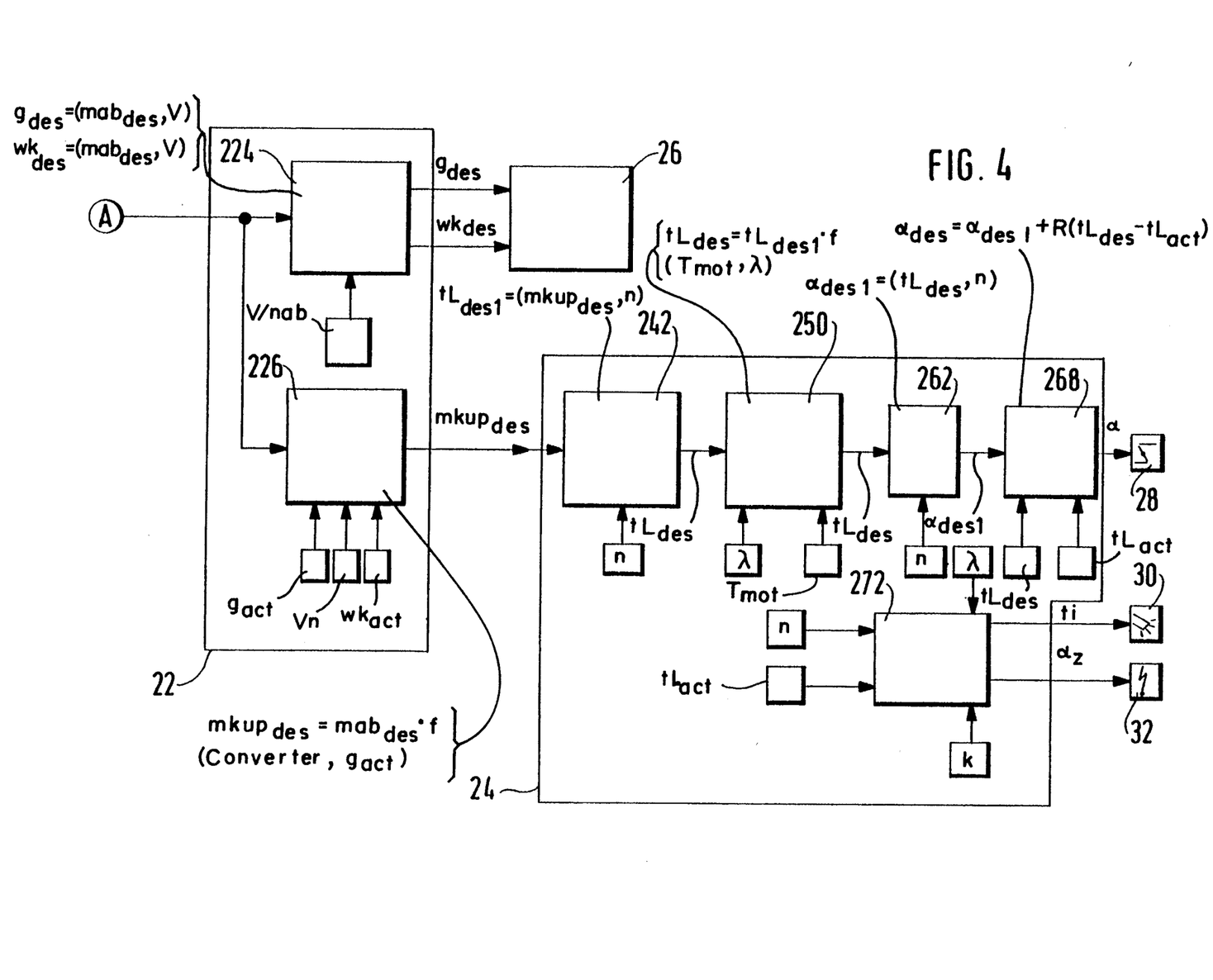

An advantageous embodiment of an electronic control system for a motor vehicle is shown in FIGS. 3 and 4. This electronic system is in simplified form and based on the system of FIG. 1.

In FIGS. 3 and 4, the elements shown in FIG. 1 are identified with the same reference numerals. The operating variables to be evaluated for carrying out the individual steps are made available via the bus which is connected to corresponding measuring units. This is shown symbolically in FIGS. 3 and 4 with respect to measuring units and connecting lines. The measuring units are identified with a symbol characterizing the operating variable.

In FIG. 3, the element 10 identified in FIG. 1 as the driver is shown in the form of measuring units for the accelerator pedal position and the brake pedal position (200, 202). The information detected there as to the position of the accelerator pedal and/or of the brake pedal is transmitted to the element 12 for the interpretation of the driver request and for determining the driving dynamic. Furthermore, a road speed signal of the vehicle is considered.

The element 12 comprises essentially a characteristic field which is shown in FIG. 3 as function unit 210. With the aid of characteristic field 210, the acceleration value (acc-des) requested by the driver is determined from the input signals: accelerator pedal position ($\beta$), road speed (V) and/or brake pedal position ($\gamma$). The acceleration value is determined as to be positive and/or negative.

In one embodiment, an optimal performance of the motor vehicle with respect to fuel consumption can be pregiven by suitably determining the characteristic field, while, in another embodiment, a sport-like operational performance is pregiven by a corresponding selection of characteristic field parameters. The characteristic field 210 can, in an advantageous embodiment, display a linear dependency between accelerator pedal position and desired acceleration value (acc-des). In this context, it should be considered that axial segment and slope of this line are dependent upon the instantaneous speed at which the vehicle is driven, that is, for a speed of 0, the slope of the line is greater than for a speed greater than 0; whereas, for higher speeds, an accelerator pedal value of 0 (that is, an accelerator pedal that has been released) corresponds to a negative acceleration. A deflection of the accelerator pedal by a pregiven amount leads thereby at lower speeds to a greater acceleration value (acc-des) than at high speeds. At the highest speed, (acc-des) is less than zero. In addition, and in an advantageous embodiment, a value representing the position of the brake pedal can be included in the characteristic field 210. In this way, in the simplest embodiment, the position of the brake pedal is directly proportional to (acc-des). A speed dependency can also be provided here in a manner analog to the foregoing.

The acceleration request of the driver determined from the characteristic field 210 is supplied via the connection 212 to the element 18 (drive chain and brake) and is converted into an acceleration desired value ($a_{des}$) or a deceleration desired value ($b_{des}$).

In element 18, a check is made in the function unit 214 via the flowchart as to whether an acceleration request or a deceleration request of the driver is present and whether a brake intervention is to be carried out (inquiry step 214a). If the acceleration request (acc-des) is less than the engine braking torque (M), that is the engine braking action in corresponding operational states (stated otherwise, if the driver desires deceleration which is only obtainable by braking), then, in step 214b, the acceleration desired value ($a_{des}$) is set equal to the engine braking torque value (M) stored in a table and, in step 214c, a brake deceleration desired value ($b_{des}$) is determined as sum of the negative acceleration request and of the engine braking torque value and is supplied to the brake system 20. In another case, for an acceleration request which is greater compared to the engine braking torque ($b_{des}$) is set equal to zero in step 214d and according to step 214e, the acceleration desired value ($a_{des}$) is set to the value of (acc-des) and supplied to the downstream function unit 216.

There, the acceleration desired value $a_{des}$ is converted into an output torque desired value for the downstream hierarchial level. For this purpose, the actual acceleration ($a_{act}$) of the motor vehicle is computed or detected by a corresponding computation unit 218 for example as a consequence of the road speed or via an acceleration sensor. This actual acceleration ($a_{act}$) is supplied to the function unit 216. Furthermore, the road speed (V) of block 219 is processed in the function unit 216. The desired value of the output torque (mab-des) is obtained from a base value m($a_{des}$, V) and an additive component R($a_{des}-a_{act}$) formed from the difference between the desired and actual values of the acceleration. The base value is read, in the simplest case, from a linear characteristic field in dependence upon the road speed and in dependence upon the acceleration desired value. The relationship between the base output torque and acceleration desired value is linear in a first approximation with the line being displaced with increasing speed parallel in a direction of greater torque. The straight lines are configured in such a manner that the computed base output torque for maintaining the pregiven acceleration is just adequate. The additive correcting term acts to increase the output torque for compensating for changing driving resistances such as wind, load and climb in order to obtain the required acceleration whereas the corrective term is 0 when $a_{des} = a_{act}$.

The output desired torque computed in this manner is transmitted to the function unit 220 and is subjected to an ASR-limitation which, when there is a tendency for the wheels to slip, limits the output torque to a slip-dependent value. The tendency of the wheels to slip is detected by reading in the wheel speeds via the computation unit 222.

In the next element 22 (engine and transmission) which is shown in FIG. 4, the output desired torque determined in element 18 is converted into a transmission ratio and into an engine desired torque or desired clutch torque, that is, the torque which occurs at the clutch disposed between the transmission and the engine. The following example relates to an electronically controllable stepped transmission having an electrically actuable converter clutch.

The determined desired output torque is, on the one hand, supplied in element 22 to a function block 224 for determining a desired transmission ratio ($d_{des}$) and a desired condition of the converter clutch ($wk_{des}$) (open or closed) of the transmission system 26 known from the state of the art via corresponding characteristic fields and, on the other hand, is transmitted to the function block 226 which undertakes the conversion of the desired output torque into a desired value of the clutch torque, that is, of the engine torque.

In the function unit 224, a road speed or output engine speed dependent characteristic field (output engine speed nab) is used for converting the output desired torque into a desired transmission ratio. The desired value of the transmission ratio ($g_{des}$) is formed by comparing the output desired torque to a pregiven reference value of the output torque for the particular road speed (V) or output engine speed (nab). A shift-up of the transmission from the first into the second gear is, for example, undertaken when the output desired torque (in an output engine speed range starting from a lower output engine speed in the range of 500 rpm to approximately 2,000 rpm) drops below a reference value which increases in this output engine speed range. In an analog manner, a shift-up from the second into the third gear and from the third into the fourth gear takes place with the output engine speed range increasing. In lieu of the output rotational speed, the engine speed can be used in another embodiment.

A shift-down, for example, from the second into the first gear takes place when the output desired torque at a specific output rotational speed (nab) or road speed (V) is greater than a pregiven reference value. In a simple embodiment, the output rotational speed ranges for the shift-down from one gear into the next lower gear is equal to those for a shift-up with the reference values for the shift-down being greater in amount than for the shift-up (hysteresis).

If a corresponding constellation between the output desired value and the reference value at the particular output rotational speed or road speed is detected, then the gear change is triggered via the input of desired transmission ratio ($g_{des}$) to the transmission system 26.

The procedure is similar to the converter clutch provided in the transmission which recognizes two states of the clutch, namely engaged or disengaged- If the engine output desired torque in a particular shift step is greater than a pregiven reference value, then the clutch is disengaged. However, if the desired value of the engine output torque is less than the reference value, the clutch is engaged. The reference values are then, as described above, in a pregiven output rotational speed range dependent upon the rotational speed of the output and increase as a rule with increasing output rotational speed with the speed range increasing with higher shift steps. The reference values for the opening of the converter clutch are for the particular engine speed or road speed greater than the reference value which causes the down shift.

If the driver, for example, desires a great acceleration of the motor vehicle, for example starting from a mid engine speed range by positioning the accelerator pedal in the full-load position, then this driver request is converted into a correspondingly large value of the desired value of the output torque. This triggers, as mentioned above, a down shift of the particular instantaneous gear position into a lower gear position and even an opening of the converter clutch.

In another embodiment, the strategy is followed that for obtaining a desired output torque, preferably a transmission downshift takes place and thereafter, for increasing the torque further, an opening of the converter clutch is provided. In another embodiment however, the reverse procedure can be followed.

In function block 226, the desired value of the output torque is converted into a desired value for the clutch torque ($mkup_{des}$) while considering the actual transmission ratio ($g_{act}$) and the actual shift position of the converter clutch ($wk_{act}$), that is, the engine torque, which is supplied to the element 24 (engine).

The desired value of the clutch torque is considered according to a formula from the desired value of the output torque, the transmission ratio and a function dependent upon the position of the converter clutch, which considers essentially the transmission ratio, the input and output rotational speed of the converter clutch, that is the ratio thereof and the rotational speed ($V_n$) of the converter clutch.

The two measures described coact in the definition of the output desired torque. If the driver requests a strong acceleration, then a down shift of the transmission is carried out and if the desired ratio is adjusted, a corresponding adaptation of the desired clutch torque is carried out. In this way, an optimally metered acceleration performance (without torque jumps) is realized.

The desired value for the clutch torque is transmitted to the element 24 (engine) which adjusts the required clutch torque by appropriate influencing of the air charge, fuel quantity and/or ignition.

In a simple embodiment, the following procedure is followed utilizing the engine temperature and, if required, a lambda value. From the specific clutch desired torque, a desired value for the load ($tL_{des1}$) is determined in function block 242 from a clutch torque-rpm-characteristic field. Basically, the load desired value for a specific engine speed value increases with increasing desired torque approximately linearly. For a clutch desired torque 0, a basic amount of the desired load value is present for overcoming the friction of the engine. With increasing engine speed, the load desired value for a constant clutch torque desired value increases. For a selection of the characteristic field, the special trace of the torque characteristic of the engine is to be considered. This can lead to the condition that the engine speed dependent trace of the load desired value climbs non-linearly for a desired engine torque; instead, in a specific engine speed range, in which the engine supplies a maximum torque, the values for the load desired value are less than in the peripheral regions. As a rule, the load desired value increases with increasing engine torque and increasing engine speed.

The load desired value determined in this manner in characteristic field 242 is transmitted to a correction characteristic field 250 wherein the load desired value is corrected in dependence upon engine temperature ($T_{mot}$) and possibly mixture composition ($\lambda$) for a continuous operation of the engine outside of $\lambda = 1$.

The correction is configured in such a manner that the correction value for the desired value of the load reduces with increasing temperature with the correction value being 0 for the normal operating temperature of the engine. In an analog manner, a lambda correction can be carried out by means of which the load desired value ($tL_{des}$) is corrected in correspondence to the desired mixture composition.

The corrected load desired value ($tL_{des}$) is supplied to the function block 262 which corresponds to an engine speed dependent characteristic field for determining a desired value for the throttle flap position ($\alpha_{des1}$) from load desired value ($tL_{des}$) and engine speed (n).

The position of the throttle flap increases with increasing engine speed at a constant load desired value. In addition, the characteristic field is configured in such a manner that with increasing load desired value at pregiven engine speed, the desired position of the throttle flap increases. For a precise definition of the characteristic field, the special dependency between throttle flap position and engine power for the individual engine type is to be considered.

The desired value formed in this way for the throttle flap position is corrected in a function block 268 with a correction value $R(tL_{des} - tL_{act})$ formed from the difference between desired load value and actual load value ($tL_{act}$) and the corrective value ($\alpha des$) is supplied to the element 28 for throttle flap adjustment which sets the throttle flap for example in the form of a known position control. The correction of the throttle flap position in function block 268 is then in such a manner that for a great difference between desired and actual values of load, an increase of the desired position of the throttle flap takes place. An idle engine speed control carried out via the throttle flap position is also to be inserted at this point.

A function block 272 is provided in element 24 wherein the fuel quantity to be metered (ti) and the ignition time point ($\alpha z$) to be set are determined in a known manner from engine speed and load actual value from a characteristic field. These two variables are supplied to the corresponding element 30 for the fuel quantity and adjusting element 32 for the ignition time point. Here, the usually available $\lambda$-control influences ($\lambda$-probe signal) and knocking control intervention (knocking sensor signal K) are utilized which influence the torque up to a maximum of a few percent.

The embodiment was illustrated in the context of a conventional air-controlled engine. In an analog manner, the embodiment can be used for fuel-guided engines and for diesel engines as well as for alternative drives such as electric drives.

The inclusion of steering and chassis control can take place in a simple manner in that the measured steering angle and the desired chassis adjustment pregiven by the driver is supplied by element 12 to the elements 14 and 16.

Furthermore, it is noted that information as to the particular operating condition of the element can be transmitted from below upwardly in the hierarchy for example when the element 24 cannot make the desired torque available. Commands however travel only from above to below.

The concept can be advantageously applied also in the context of manual clutch transmissions.

It is understood that the foregoing description is that of the preferred embodiments of the invention and that various changes and modifications may be made thereto without departing from the spirit and scope of the invention as defined in the appended claims.

What is claimed is:

1. An electronic control system for a motor vehicle having a drive assembly and a braking apparatus for braking the vehicle, the drive assembly including a motor and a transmission, the electronic control system comprising:

means for controlling said braking apparatus;
   first means defining an upper hierarchial level and being provided for detecting driver commands and for generating first control commands corresponding to said drive commands;
   second means defining a mid hierarchial level;
   third means for controlling said drive assembly;
   said second means being provided for receiving said first control commands and for generating second and further control commands corresponding to said first control commands for controlling the operating performance of the motor vehicle in accordance with said driver commands and for transmitting said further control commands to said means for controlling said braking apparatus and for transmitting said second control commands to said third means for controlling said drive assembly;
   said third means defining a lower hierarchial level and being provided for receiving said second control commands and for generating third control commands based on said second control commands and for emitting said third control commands for controlling said motor and said transmission to effect a control of said operating performance of said motor vehicle in accordance with said second control commands;
   said second means being a coordinating element adapted to provide the drive commands by acting on said braking apparatus of the vehicle and by controlling the drive assembly of the vehicle while inputting a desired output torque of the drive assembly; and,
   each of the command exchanges taking place between said hierarchial levels in only one direction.

2. The electronic control system of claim 1, further comprising interfaces between each two of said hierarchial levels.

3. The electronic control system of claim 1, wherein the driver defines a hierarchial level above said upper hierarchial level.

4. The electronic control system of claim 1, said first means including detecting means for detecting wheel torque of the motor vehicle required by the driver; and, one of said hierarachial levels including a coordinating element adapted to provide the wheel torque requested by the driver.

5. The electronic control system of claim 13, one of said hierarchial levels including a coordinating element adapted to convert the requested output torque into a desired motor torque and a transmission ratio.

6. The electronic control system of claim 5, one of said hierarchial levels including a coordinating element adapted to provide the requested motor torque by adjusting power-determining variables of the motor.

7. The electronic control system of claim 6, one of said hierarchial levels including a coordinating element for converting the actuating signals of the driver into a desired steering angle.

8. The electronic control system of claim 7, further comprising a bus system; control units for controlling said braking apparatus, said transmission and said motor, said control units being connected to said bus system; and, a master controller being connected to said control units via said bus system and containing at least one of said coordinating elements.

9. The electronic control system of claim 1, comprising characteristic field means for converting one of said driver commands into an acceleration in dependence upon accelerator pedal position and road speed and actuation of said braking apparatus.

10. The electronic control system of claim 9, wherein said acceleration is converted into a desired output torque while considering the road speed and the actual acceleration.

11. The electronic control system of claim 1, further comprising a characteristic field for converting a desired output torque into a desired transmission condition while evaluating the output rotational speed or road speed; computation means for computing a desired clutch torque or motor torque from a desired output torque and actual transmission condition; and, additional characteristic fields for converting said desired clutch torque or desired motor torque into desired values for the power-determining variables of the motor.

* * * * *

UNITED STATES PATENT AND TRADEMARK OFFICE
CERTIFICATE OF CORRECTION

PATENT NO. : 5,351,776

DATED : October 4, 1994

INVENTOR(S) : Frieder Keller, Martin Streib, Otto Holzinger, Rolf Leonhard and Thomas Gölzer It is certified that error appears in the above-identified patent and that said Letters Patent is hereby corrected as shown below:

In the title page, in the abstract, line 2: between "an" and "control", insert -- electronic --.

In column 1, line 26: delete "Causes" and substitute -- causes -- therefor.

In column 1, line 30: delete "accomodating" and substitute -- accommodating -- therefor.

In column 4, line 66: delete "oh" and substitute -- on -- therefor.

In column 5, line 1: delete "con, hands" and substitute -- commands -- therefor.

In column 5, line 5: delete "tile" and substitute -- the -- therefor.

In column 6, line 51: delete "Control" and substitute -- control -- therefor.

In column 10, line 65: delete "disengaged-" and substitute -- disengaged. -- therefor.

UNITED STATES PATENT AND TRADEMARK OFFICE
CERTIFICATE OF CORRECTION

PATENT NO. : 5,351,776

DATED : October 4, 1994

INVENTOR(S) : Frieder Keller, Martin Streib, Otto Holzinger, Rolf Leonhard and Thomas Gölzer It is certified that error appears in the above-identified patent and that said Letters Patent is hereby corrected as shown below:

In column 12, line 38: delete "αdes" and substitute -- $\alpha_{des}$ -- therefor.

In column 13, line 25: delete "drive" and substitute -- driver -- therefor.

In column 13, line 49: delete "drive" and substitute -- driver -- therefor.

In column 14, line 15: delete "claim 13," and substitute -- claim 1, -- therefor.

Signed and Sealed this

Fourteenth Day of February, 1995

Attest:

BRUCE LEHMAN

*Attesting Officer*     *Commissioner of Patents and Trademarks*